(12) United States Patent
Söhnchen et al.

(10) Patent No.: US 12,545,210 B2
(45) Date of Patent: Feb. 10, 2026

(54) BELT TIGHTENER FOR A SAFETY BELT SYSTEM IN A MOTOR VEHICLE

(71) Applicant: AUTOLIV DEVELOPMENT AB, Vargarda (SE)

(72) Inventors: Arndt Söhnchen, Hamburg (DE); Thouseef Aqeeb, Karnataka (IN); Ronald Jabusch, Elmshorn (DE); Hans-Jörg Langhoff, Bönningstedt (DE); Antto-Christian Glaesser, Mömbris (DE); Vengatesh Ramar, Karnataka (IN); Alexandru Cirstea, Elmshorn (DE); Jens Ehlers, Horst (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 313 days.

(21) Appl. No.: 18/258,099

(22) PCT Filed: Nov. 12, 2021

(86) PCT No.: PCT/EP2021/081485
§ 371 (c)(1),
(2) Date: Jun. 16, 2023

(87) PCT Pub. No.: WO2022/128274
PCT Pub. Date: Jun. 23, 2022

(65) Prior Publication Data
US 2024/0051495 A1 Feb. 15, 2024

(30) Foreign Application Priority Data
Dec. 16, 2020 (DE) .................. 10 2020 133 790.6

(51) Int. Cl.
*B60R 22/46* (2006.01)

(52) U.S. Cl.
CPC .. *B60R 22/4604* (2013.01); *B60R 2022/4666* (2013.01)

(58) Field of Classification Search
CPC .............. B60R 22/4604; B60R 22/195; B60R 2022/4666
USPC ........................................................ 297/480
See application file for complete search history.

(56) References Cited

U.S. PATENT DOCUMENTS

| | | | | |
|---|---|---|---|---|
| 5,201,385 A | * | 4/1993 | Browne | .................... B60T 8/00 |
| | | | | 280/807 |
| 5,552,986 A | | 9/1996 | Omura et al. | |
| 6,394,495 B1 | | 5/2002 | Specht | |
| 8,888,137 B2 | * | 11/2014 | Rao | .......................... B60R 22/36 |
| | | | | 297/480 |
| 2008/0264710 A1 | * | 10/2008 | Odate | ................. B60R 21/0134 |
| | | | | 701/45 |

(Continued)

FOREIGN PATENT DOCUMENTS

DE 4411184 C2 6/1998
DE 10029061 A1 1/2002

(Continued)

*Primary Examiner* — Jose V Chen
(74) *Attorney, Agent, or Firm* — Dickinson Wright PLLC

(57) ABSTRACT

A belt tightener for a safety belt system in a motor vehicle comprises at least one electric actuator. A decentralized, independent electric energy store designed to store a sufficient amount of electric energy for operating the actuator is dedicated to the belt tightener.

15 Claims, 2 Drawing Sheets

(56) References Cited

U.S. PATENT DOCUMENTS

| | | | |
|---|---|---|---|
| 2008/0290203 A1* | 11/2008 | Kohlndorfer | B60R 22/46 242/374 |
| 2012/0119009 A1* | 5/2012 | Saito | B60R 22/46 242/374 |
| 2015/0251628 A1* | 9/2015 | Tatsuma | B60R 22/46 242/394.1 |
| 2019/0337482 A1 | 11/2019 | Grzic | |
| 2020/0047710 A1 | 2/2020 | Jabusch et al. | |
| 2021/0387593 A1* | 12/2021 | Jabusch | B60R 22/44 |
| 2021/0394707 A1* | 12/2021 | Jessup | B60R 22/3416 |
| 2023/0234533 A1* | 7/2023 | Jabusch | B60R 22/46 242/396.2 |

FOREIGN PATENT DOCUMENTS

| | | | | |
|---|---|---|---|---|
| DE | 102011016615 A1 | | 12/2011 | |
| DE | 102017212975 A1 | | 1/2019 | |
| DE | 102018213279 A1 | * | 2/2020 | B60R 22/26 |
| DE | 102018219040 A1 | | 5/2020 | |
| WO | 03059707 A1 | | 7/2003 | |
| WO | 2018125680 A1 | | 7/2018 | |

* cited by examiner

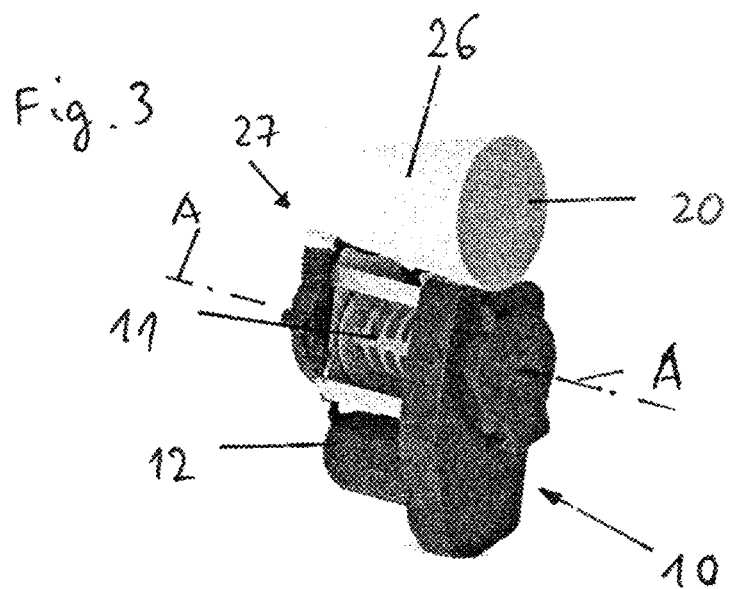
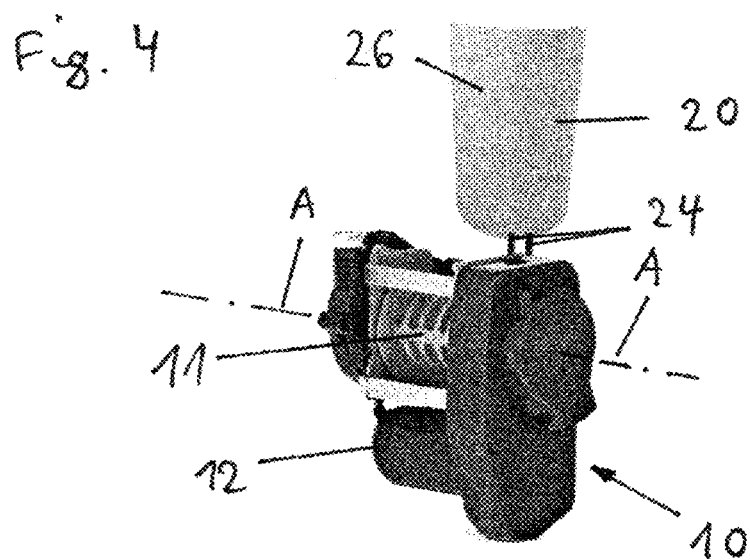

BELT TIGHTENER FOR A SAFETY BELT SYSTEM IN A MOTOR VEHICLE

The present invention relates to a belt tightener for a safety belt system in a motor vehicle, comprising at least one electric actuator.

Safety belt systems today are no longer purely mechanical products. In addition to mechanics, they may contain pyrotechnical, electronic and/or electromechanical components. Today's reversible belt tighteners, regardless of the installation point (in the retractor or tensioner, seat belt buckle or end stop), are capable of reducing belt slack already in critical driving situations, thus restraining the occupant at an early stage. Such reversible belt tensioners for safety belt systems are sufficiently known in the prior art, see for example DE 44 11 184 C2 and DE 100 29 061 A1. One function of a reversible belt tightener is to pull out existing belt slack from the safety belt system in a situation where an accident may follow, also referred to as the pre-crash phase, in order to connect the occupant to the vehicle deceleration as early as possible in a possible subsequent accident situation. This distributes the occupant load over as long a forward displacement path as possible and reduces the maximum value of the occupant load. Further, reversible belt tighteners can also serve as a warning system to alert the occupant to a hazardous situation.

In the event that the pre-impact phase is not followed by an accident, the belt tightener is deactivated again and the belt force is lowered again. For this reason, it is important that the belt tightener works reversibly. Reversible belt tighteners, for example, can have an electric motor drive that is particularly easy to actuate without any time delay.

In general, reversible belt tighteners can advantageously prevent forward displacement from the design position. The response time here is in the range of a few milliseconds. Due to the short response time and because of the mechanical work required, a certain amount of electrical energy is needed for this.

In general, a number of questions arise for belt tighteners with one or more electrical actuators: i) How can the required electrical energy be conducted to the actuator in a short time? The following points also play a role: small line cross-sections are desirable in the motor vehicle to reduce weight; the distance of the vehicle battery or generator from the actuator must also be taken into account; if the belt tightener is installed in a vehicle seat, there is a detachable electrical connection point. ii) How can the energy supply be ensured in the event of an accident if there is a risk that the alternator and/or vehicle battery will be damaged shortly after the impact (for example by short-circuiting) and/or disconnected for safety by means of a safety switch and/or supply lines or plug-in connections are disconnected? iii) How can the required energy be provided if the vehicle electrical system voltage is at the lower limit or many energy consumers access the vehicle electrical system at the same time? The following points also play a role: a small alternator is desirable in the motor vehicle to reduce weight; the vehicle battery may be weak or its capacity on reserve, for example, in winter or due to age; shortly before an accident situation is detected (time t0), high-current consumers such as ESC (Electronic Stability Control), reversible belt tightener, seat adjustment, window lifters, etc. respond at the same time, which places a particular load on the vehicle battery.

The object of the invention is to ensure reliable actuation of the electric actuator in every possible situation.

The invention solves this object with the features of the independent claims. According to the invention, a decentralized, independent electric energy store is associated with the belt tightener and is configured to store an amount of electric energy sufficient to operate the actuator. Decentralized means that the electric energy store is provided in addition to the vehicle battery and is at the location or in the area of the belt tightener. Independent means that the electric energy store is independently functional and provides electrical energy regardless of the state of the vehicle battery or supply lines between the vehicle battery and the belt system.

The solution according to the invention lies in a decentralized, independent and preferably diagnosable energy store as an energy source, which is advantageously placed on the actuator. This can be a battery, an accumulator or a capacitor, which can provide the required energy for different load cases. Preferably, the energy store comprises at least one supercapacitor, ultracapacitor, double-layer capacitor, or electrochemical capacitor in general, in order to be able to store the required amount of energy with a small installation space. It is advantageous to use at least one high-voltage capacitor with a rated voltage of at least 100 V, preferably at least 200 V, and further preferably at least 300 V, since high-voltage capacitors generally require less installation space. It can be advantageous for the design as a high-voltage capacitor or generally for the electromagnetic shielding of the interior of the energy store (Faraday cage) and the surrounding area if the energy store is encased by a metallic housing. However, a plastic housing for the energy store is also possible for the purpose of simple electrical insulation.

The use case and the amount of energy required, as well as the voltage used internally, determine the energy storage volume required for the electrical energy. For example, considerable energy is required to tighten the belt system, which is said to be comparable to pyrotechnic tightening. Accordingly, the energy store is preferably configured to store an amount of energy of at least 100 J, further preferably at least 150 J, still further preferably at least 200 J, at least 1000 J, at least 1500 J, or at least 2000 J. The installation location and the actuator used then determine the design and installation position of the energy store.

In preferred embodiments, the at least one electric actuator comprises an electric motor advantageously configured to reversibly pre-tighten and/or power tighten the seat belt. In some embodiments, the energy store may be used to power an electromechanical force limiter. Preferably, the energy store is configured to store an amount of electrical energy sufficient to perform one or more of the following functions: reversible seat belt pretensioning in a pre-accident situation; power tensioning in the event of an unavoidable vehicle impact; electromechanical force limiting. These functions are briefly explained below.

Reversible belt pretensioning is performed when a critical driving situation or an impending accident situation is detected, but wherein it is still unclear whether or not a vehicle impact will occur. In this situation, as a precaution, belt slack is already retracted to better couple the occupant to the vehicle and prevent movement from the design position. This favors a possibly following power tightening, as this can start from an already pre-tightened level. If it turns out that a vehicle collision could be avoided, the belt pretensioning is released again and the seat belt can be pulled out freely again.

The belt tightener according to the invention can be used advantageously in various applications. A preferred application relates to a belt retractor (retractor). In some embodiments, the seat belt retractor is designed and configured for arrangement in a vehicle seat, particularly in a backrest thereof. In this case, it may be advantageous from the point of view of installation space if the belt reel, a force limiter, a gearbox and the electric motor are arranged coaxially to one another in the belt retractor such as to form a continuous longitudinal axis A.

Other possible use cases for the belt tightener according to the invention relate to the arrangement in a belt buckle as a so-called buckle tightener or the arrangement on an end fitting as a so-called end fitting tightener.

Advantageously, the electric energy store is used exclusively to supply energy to electric components and actuators of the belt tightener or the belt system or an occupant restraint system including airbags, but not to supply energy to electric components and actuators of other vehicle systems. This has the advantage that energy is not drawn from other vehicle systems and all the energy stored in the electric energy store is available to the belt tightener/belt system/occupant restraint system.

Further, the energy store can be recharged by actuating an electromechanical force limiter in generator mode, such that the energy store is at least partially charged with energy after the force-limited belt extension has taken place. This energy can still be used subsequently, for example, to trigger an emergency call or a warning signal.

The invention is explained below using preferred embodiments with reference to the accompanying figures. The following are shown:

FIG. 3 shows a belt retractor for the B-pillar with a belt tightener according to the invention in a third embodiment; and FIG. 4 shows a belt retractor for the B-pillar with a belt tightener according to the invention in a fourth embodiment.

Figure 1:
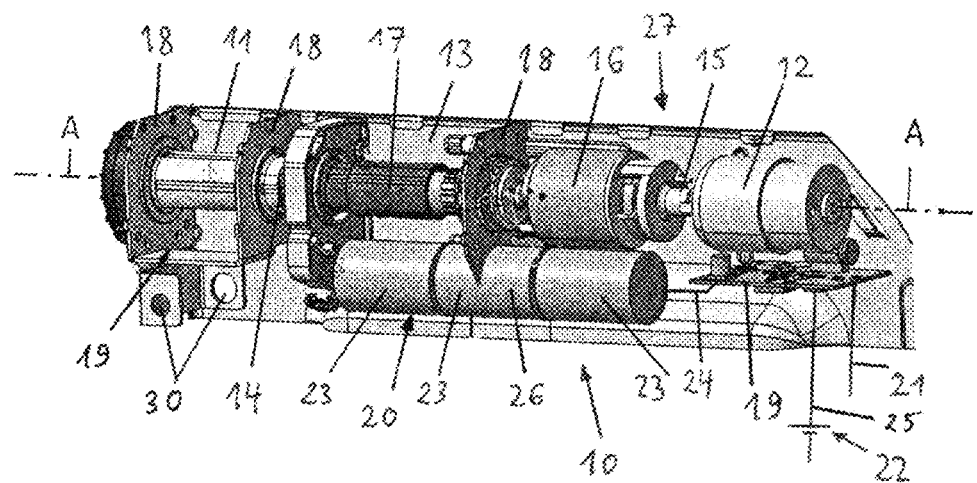
FIG. 1 shows a belt retractor for a vehicle seat with a belt tightener according to the invention in a first embodiment.
Figure 2:
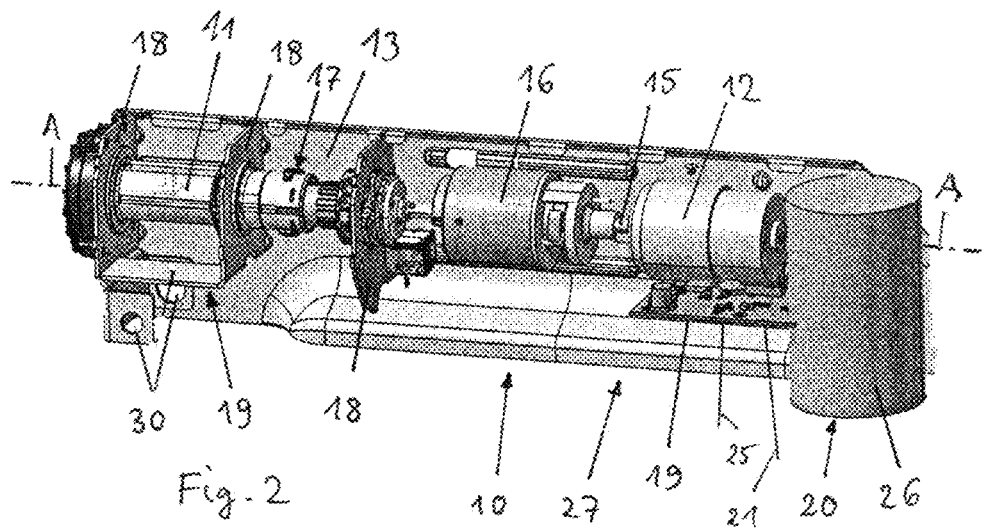
FIG. 2 shows a belt retractor for a vehicle seat with a belt tightener according to the invention in a second embodiment.

The embodiments in accordance with FIGS. 1 and 2 relate to a belt tensioner 10 for mounting on or in a vehicle seat, in particular on a carrier, for example a transverse beam, in the backrest of a vehicle seat.

The belt retractor 10 comprises a housing 13 fixed to the vehicle and having carrying elements 18, 19 fixed to the vehicle, for example comprising transverse beams 18, and fastening points 30 for fastening the belt retractor 10 to the vehicle structure. The belt retractor 10 comprises a belt reel 11 rotatably mounted in the housing 13 or a U-shaped carrying element 19, on which a passenger safety belt not shown can be wound. The belt reel 11 is non-rotatably connected to a coaxial belt shaft 14.

The belt retractor 10 further comprises a belt tightener 27 having an electric motor 12 for rotating the belt shaft 14 and thus the belt reel 11. The motor shaft 15 of the electric motor 12 is connected to a gearbox 16, which transmits the rotary movement of the motor shaft 15 to the belt shaft 14. Functionally arranged between the gearbox 16 and the belt reel 11 is a force limiter 17, which limits the force exerted by the seat belt on the occupant during vehicle impact. The force limiter 17 may, for example, contain a torsion bar or be based on some other mechanism of action.

The belt reel 11, the force limiter 17, the gearbox 16 and the electric motor 12 are advantageously arranged coaxially with respect to one another (see FIGS. 1 and 2), such that the overall elongated belt retractor 10 extends along a continuous longitudinal axis A that extends centrally through the belt shaft 11 and the motor shaft 15. This arrangement is particularly suitable for mounting on a carrier fixed to the seat, for example a transverse beam in a vehicle seat backrest.

The electric motor 12 is configured to perform one or more of the following functions: reversible belt pretensioning in a pre-accident situation; power tensioning in the event of an unavoidable vehicle impact; electromechanical force limiting. These functions have been explained before. It is also conceivable to make the stored energy available selectively for individual functions, for example for power tightening or force limitation depending on the situation. To perform these functions, the belt retractor 10 advantageously has a digital electronic control apparatus 19, which comprises, for example, a microprocessor or microcontroller and is advantageously connected to the vehicle bus via a signal line 21. The signal line 21 can also be used to send a diagnostic signal containing data about the state of charge and/or wear of the energy store 20 to an electronic control unit of the vehicle. In this manner, the energy store 20 can be advantageously diagnosed and appropriate measures can be taken, for example, in the event of wear of the energy store 20. Diagnostic data from the energy store can be transmitted to the control apparatus 19 via the line 24, which can be beneficial for charge control.

An energy store 20 is associated with the belt retractor 10, which is dimensioned to store a sufficient amount of energy to perform all of the intended functions of the electric motor 12 (reversible belt pretensioning, power tightening, etc.) without any further energy supply from the outside, particularly without energy supply from the vehicle battery. For example, when a pre-accident trigger signal is received via bus line 21, the control apparatus 19 controls the electric motor 12 to perform the reversible belt pretensioning, wherein the electrical energy required for this purpose is obtained via an electrical supply line 24 that connects the electric motor 12 to the energy store directly or indirectly via the control apparatus 19. The same applies if, for example, an accident trigger signal is received by the control apparatus 19 via the bus line 21. In a pre-accident or accident situation, the function of the belt tightener 10 is therefore ensured in any case, even if the supply line 22 from the vehicle battery 23 should be interrupted or the vehicle battery 23 is overloaded or fails for other reasons.

The energy store 20, for example a supercapacitor, is preferably sized and configured to store an amount of energy of at least 100 J, preferably at least 150 J, further preferably at least 200 J, still further preferably 1000 J, 1500 J or 2000 J. The energy store 20 is preferably part of the belt retractor and/or arranged within the housing 13. The energy store 20 may also be arranged outside the housing 13 and/or be a separate component from the belt retractor 10.

Preferably, the energy store 20 may be enclosed in a metal housing 26. This allows the use of high-voltage capacitors of 100 V or more, which can advantageously further reduce the volume of the energy store 20. Other advantages of a metallic housing 26 are electrical shielding of the interior of the energy store 20 (Faraday cage) and the surrounding area. Grounding a metallic housing 26 may be advantageous. Embodiments having a housing 26 made of plastic or a combination of metal and plastic housing are possible, which provides electrical insulation in a simple manner.

Advantageously, the control apparatus 19 comprises an electronic charge control connected to the vehicle battery 22 via a supply line 25. The charging control provides charging of the energy store 20 when the state of charge of the energy store 20 is low or has dropped below a certain threshold.

Furthermore, a transformer may be provided for transforming the on-board voltage to the charging voltage for the energy store 20. This allows a charging cycle with lower current to be realized during normal operation of the vehicle. Intelligent charging may also be provided, in which the charging process is interrupted in critical situations and then resumed in normal operation after the critical situation has ended. If the energy store is coupled to an electromechanical force limiter, activation of the electromechanical force limiter can also be used to charge the energy store 20. This charging takes place during the restraint of the occupant in the accident or during the force-limited forward displacement of the occupant in the accident and can subsequently be used, for example, to send an emergency call or a warning signal after the accident has ended.

In the embodiment in accordance with FIG. 1, the energy store 20 is elongated, for example cylindrical, and advantageously arranged axially parallel to the longitudinal axis A of the belt retractor 10, for example below the shaft axis 14, 15. In order to be able to use a relatively thin energy store 20 (i.e., with a relatively small diameter) due to space constraints, the energy store may preferably comprise a plurality of smaller, for example cylindrical, storage units 23 arranged in series along a longitudinal axis of the energy store 20, as shown in FIG. 1. Advantageously, the energy store 20 may be held on one or more transverse beams 18. The retractor/tensioner 10 and energy store 20 could advantageously be placed within the upper transverse beam of a vehicle seat, providing sufficient space for the occupant to dive through in the event of a rear impact, for example.

In the embodiment in accordance with FIG. 2, the energy store 20 is, for example, cylindrical and advantageously arranged radially, transversely, obliquely or at an angle to the longitudinal axis A of the belt retractor 10. In this embodiment, the energy store 20 is a separate component, for example, and may be arranged in or on the side member of a vehicle seat back, for example.

The embodiments in accordance with FIGS. 3 and 4 relate to an application to a retractor 10 in particular for installation in the B-pillar of the vehicle. In this case, an arrangement of the energy store 20 parallel to the shaft axis A (FIG. 3) above or below that of the belt spool 11 is suitable, depending on where the actuator (electric motor 12) is placed, because the installation space in the B-pillar is very limited in x- and y-dimensions. The design of the B-pillar may also necessitate installation with a separate energy store 20, as shown in FIG. 4. An arrangement perpendicular or radial to the shaft axis A as in FIG. 4 is also possible.

In the figures, an energy store 20 for operating an electric motor 12 in a belt retractor 10 has been described. Corresponding use cases on a seat belt buckle tightener or an end fitting tightener of a safety belt system are possible.

The invention claimed is:

1. A belt tightener for a safety belt system in a motor vehicle, comprising
at least one electric actuator operably connected to a seat belt of the safety belt system,
wherein
a decentralized, electric energy store that is independent from a battery system of the motor vehicle and is operably connected to the belt tightener and is configured to store an amount of electric energy sufficient to operate the actuator.

2. The belt tightener according to claim 1, wherein the energy store comprises a battery, an accumulator and/or a capacitor, in particular a supercapacitor.

3. The belt tightener according to claim 1, wherein the energy store comprises at least one high-voltage capacitor having a nominal voltage of at least 100 V.

4. The belt tightener according to claim 1, wherein the energy store is configured to store an amount of energy of at least 100 J.

5. The belt tightener according to claim 1, wherein the at least one electric actuator comprises an electric motor.

6. The belt tightener according to claim 5, wherein the electric motor and belt tightener are configured to reversibly pre-tighten and/or power tighten the seat belt.

7. The belt tightener according to claim 1, wherein the at least one electric actuator is part of an electromechanical force limiter.

8. The belt tightener according to claim 1, wherein the energy store is configured to store an amount of electrical energy sufficient to perform one or more of the following functions:
reversible belt pretensioning in a pre-accident situation;
power tightening in case of unavoidable vehicle impact;
electromechanical force limitation.

9. The belt tightener according to claim 1, wherein the energy store has a metallic housing.

10. The belt tightener according to claim 1, wherein the energy store is rechargeable by actuation of an electromechanical force limiter.

11. A belt retractor, comprising
a belt reel rotatably mounted in a housing which can be fixed to a vehicle and on which a safety belt can be wound; and
a belt tightener according to claim 1.

12. The belt retractor according to claim 11, wherein the belt retractor is designed and configured for arrangement in a vehicle seat.

13. The belt retractor according to claim 11, wherein the belt reel, a force limiter, a gearbox and the electric actuator are arranged coaxially with one another to form a continuous longitudinal axis A.

14. A belt buckle for a safety belt system in a motor vehicle, wherein the belt buckle has a belt tightener according to claim 1.

15. A safety belt end stop for a safety belt system in a motor vehicle, wherein the safety belt end stop has a belt tightener according to claim 1.

* * * * *